(12) United States Patent
Yanagida et al.

(10) Patent No.: US 7,453,711 B2
(45) Date of Patent: Nov. 18, 2008

(54) STEP-UP POWER SUPPLY UNIT AND PORTABLE APPARATUS UTILIZING THE SAME

(75) Inventors: Osamu Yanagida, Kyoto (JP); Kunihiro Komiya, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 11/084,472

(22) Filed: Mar. 18, 2005

(65) Prior Publication Data

US 2005/0213356 A1  Sep. 29, 2005

(30) Foreign Application Priority Data

Mar. 26, 2004  (JP) .............................. 2004-091170

(51) Int. Cl.
*H02M 3/18* (2006.01)
*H02M 7/00* (2006.01)
*H02M 7/19* (2006.01)

(52) U.S. Cl. ......................................... 363/59; 363/60
(58) Field of Classification Search ................... 363/59, 363/60
See application file for complete search history.

(56) References Cited

U.S. PATENT DOCUMENTS

| | | | | |
|---|---|---|---|---|
| 4,523,269 A * | 6/1985 | Baker et al. | ................. | 363/138 |
| 4,897,774 A * | 1/1990 | Bingham et al. | .............. | 363/61 |
| 5,095,223 A * | 3/1992 | Thomas | ..................... | 307/110 |
| 5,132,895 A * | 7/1992 | Kase | ........................... | 363/60 |
| 5,187,421 A * | 2/1993 | Naito | ......................... | 363/59 |
| 5,424,934 A * | 6/1995 | Tanuma et al. | ................ | 363/65 |
| 5,436,587 A * | 7/1995 | Cernea | ...................... | 327/536 |
| 5,461,557 A * | 10/1995 | Tamagawa | .................. | 363/60 |
| 5,532,916 A * | 7/1996 | Tamagawa | .................. | 363/62 |
| 5,912,560 A * | 6/1999 | Pasternak | ................... | 324/536 |
| 6,522,110 B1 * | 2/2003 | Ivanov | ....................... | 323/267 |
| 6,563,235 B1 * | 5/2003 | McIntyre et al. | ........... | 307/109 |
| 6,737,838 B2 * | 5/2004 | Sluijs et al. | ................. | 323/225 |
| 6,946,820 B2 * | 9/2005 | Ishii et al. | .................. | 323/222 |
| 6,985,024 B2 * | 1/2006 | Geen | .......................... | 327/536 |

FOREIGN PATENT DOCUMENTS

| | | |
|---|---|---|
| JP | 52-030470 | 3/1977 |
| JP | 07-176698 | 7/1995 |
| JP | 2002-291232 | 10/2002 |
| JP | 2003-241706 | 8/2003 |
| JP | 2003-264976 | 9/2003 |

* cited by examiner

*Primary Examiner*—Bao Q Vu
(74) *Attorney, Agent, or Firm*—Hogan & Hartson LLP (57) ABSTRACT

A step-up power supply unit for providing a multiplicity of different step-up voltages as needed, generated by stepping up a voltage of a single power source such as a battery. The step-up voltage of the last stage charge pump unit and the step-up voltage of at least one charge pump unit other than the last stage charge pump unit, are made available as multiple output voltages. When one or more of the output voltages are not needed, all the charge pump units subsequent to the one providing the highest output voltage are disabled based on an output voltage control signal, thereby minimizing the size and cost of the step-up circuit and reducing the power consumption by the circuit.

2 Claims, 5 Drawing Sheets

PRIOR ART

STEP-UP POWER SUPPLY UNIT AND PORTABLE APPARATUS UTILIZING THE SAME

FIELD OF THE INVENTION

This invention relates to a step-up power supply unit for providing a multiplicity of different output voltages stepped up from the voltage of a single power source such as a battery as needed, and to a portable apparatus such as a mobile phone utilizing the same.

BACKGROUND OF THE INVENTION

Conventionally, a multiplicity of different step-up voltages for use with different load apparatuses are generated from a rechargeable battery.

Figure 5:
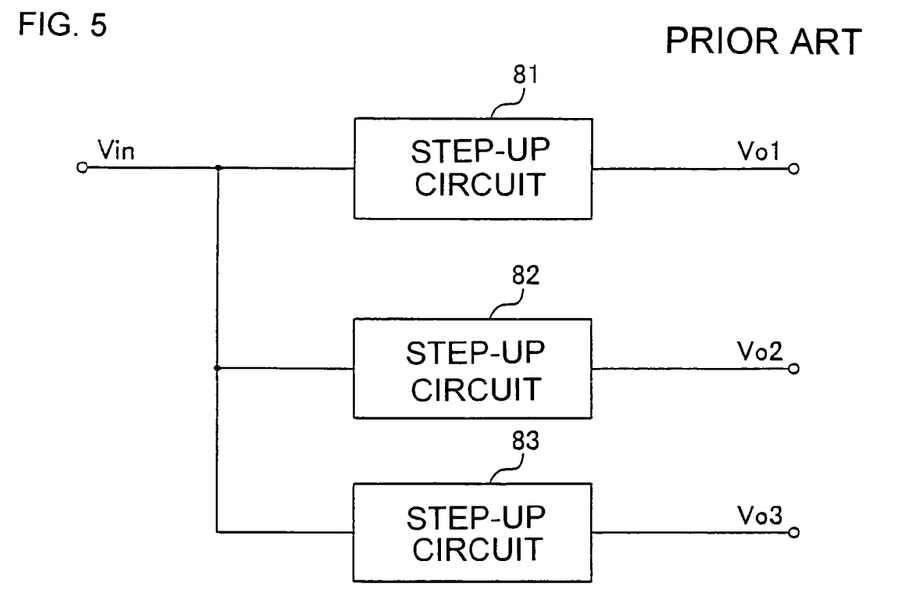
FIG. 5 is a circuit diagram of a conventional power supply unit for generating a multiplicity of output voltages from a single power source.

FIG. 5 shows a conventional power supply circuit adapted to generate a multiplicity of step-up voltages from a single power source, as disclosed in Japanese Patent Application Laid Open No. 07-176698. The power supply circuit has step-up circuits 81-83 for generating three outputs Vo1-Vo3.

Figure 6:
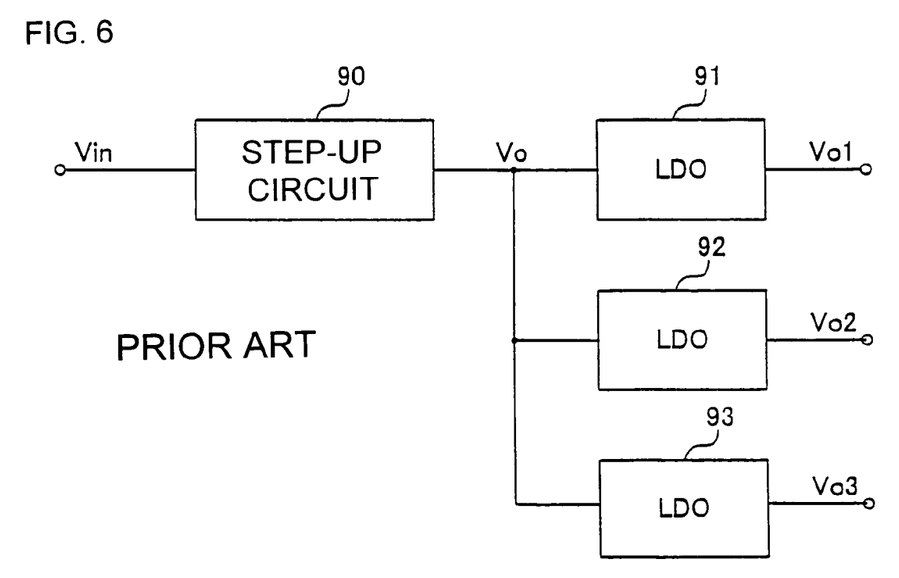
FIG. 6 is a circuit diagram of another conventional power supply unit for generating a multiplicity of output voltages from a single power source.

FIG. 6 shows another conventional power supply circuit having a step-up circuit 90, which is adapted to generate an output voltage Vo that corresponds to the highest one (Vo1) of the required output voltages and regulators (LDO) 91, 92, and 93 for reducing the voltage Vo to predetermined output voltages Vo1, Vo2, and Vo3.

Such conventional power supply unit as shown in FIG. 5, however, requires the same number of step-up circuits as the number of output voltages required. As a consequence, the power supply circuit, and hence the LSI that accommodates the power supply circuit, becomes large and results in increased costs.

Although the conventional power supply circuit of FIG. 6 requires only one step-up circuit 90, it generates a high step-up voltage Vo associated with the highest output voltage Vo1. Hence, there will be large differences between the highest output voltage Vo1 and other output voltages Vo2 and Vo3. This implies that the regulators entail large amount of energy loss that lowers the power conversion efficiency of the power supply circuit.

SUMMARY OF THE INVENTION

It is, therefore, an object of the invention to provide a cost-effective and power-effective step-up power supply unit having a reduced LSI for generating different output voltages from a single power source voltage of a battery, for example.

It is another object of the invention to provide a portable apparatus utilizing such power supply unit.

In accordance with one aspect of the invention, there is provided a step-up power supply unit having N stages (N being an integer greater than 1) of charge pump units connected in series (the stages hereinafter referred to as first stage through N stage, respectively), each charge pump unit including a capacitor and a switch circuit, with the first stage charge pump unit fed an input voltage, wherein:

the step-up power supply unit is adapted to output a multiplicity of output voltages based on the step-up voltages of the last stage charge pump unit and of at least one charge pump unit other than the last stage charge pump unit; and the output voltage based on the step-up voltage of said at least one charge pump unit other than the last stage charge pump unit is the step-up voltage output from at least one charge pump unit via an output switch that is synchronized with the clock controlling the on-off operation of the switch circuit and is controlled by an output voltage control signal.

The output voltage based on the step-up voltage of the last stage charge pump unit may be output without passing through any output switch.

When one or more of the output voltages are not needed, the charge pump units in all the stages subsequent to the stage that provides the highest output voltage may be disabled by the output voltage control signal.

The output voltage of each stage is smoothed and regulated by a regulator of that stage.

Each of the charge pump units may include: a capacitor; a first double-throw switch having a common terminal connected to one end of the capacitor; and a second double-throw switch having a common terminal connected to the other end of the capacitor and controlled by the same control signal as controlling the first double-throw switch.

Each of the charge pump units may include: a capacitor; a single-throw switch having one terminal connected to one end of the capacitor; and a double-throw switch having a common terminal connected to the other end of the capacitor and operated by the same control signal as controlling the single-throw switch.

A portable apparatus of the invention has different components that utilize different output voltages of the inventive step-up power supply unit.

The inventive step-up power supply unit has a single charge pump step-up circuit for generating a multiplicity of output voltages as needed from a single power source such as a battery. An inventive portable apparatus utilizes such power supply unit. The invention thus facilitates reduction of size and cost of the LSI incorporating such step-up power supply unit.

The invention can also reduce power consumption in the step-up circuit by: providing minimum output power as needed at any moment; and partly stopping the switching of the step-up circuit, that is, controlling the number of charge pump units in use, in accordance with the power to be output.

Further, the invention can supply an optimal step-up voltage to each of the regulators, thereby not only minimizing power losses by the regulators in the respective stages but also improve power conversion efficiency of the power supply unit.

Particularly, in the charge pump unit belonging to the last stage, the output switch can be omitted, so that the control signal therefor may be omitted. Accordingly, the step-up power supply unit can be simplified in structure.

DETAILED DESCRIPTION OF THE PREFERRED EMBODIMENTS

Figure 1:
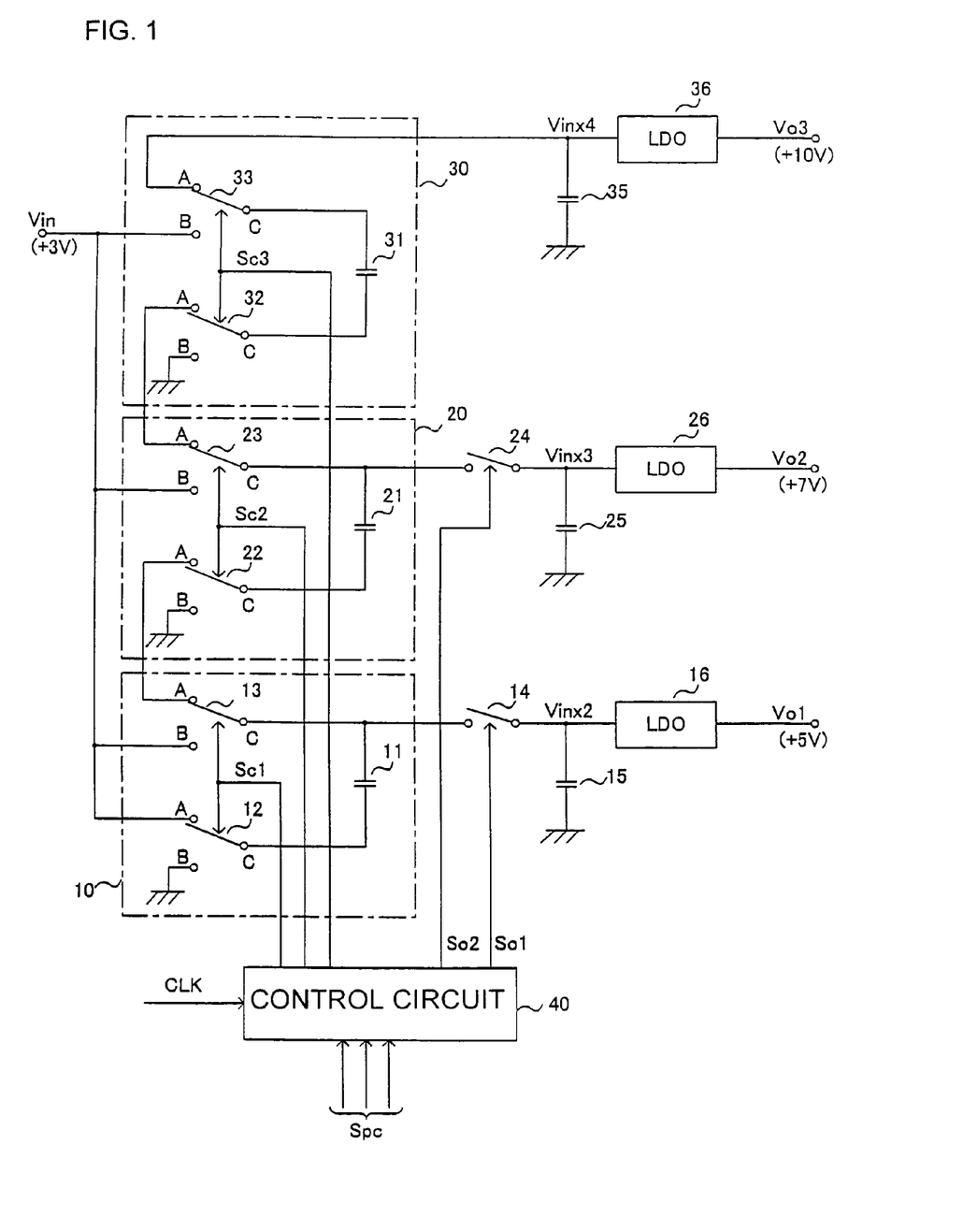
FIG. 1 is a circuit diagram of a step-up power supply unit in accordance with a first embodiment of the invention.
Figure 2:
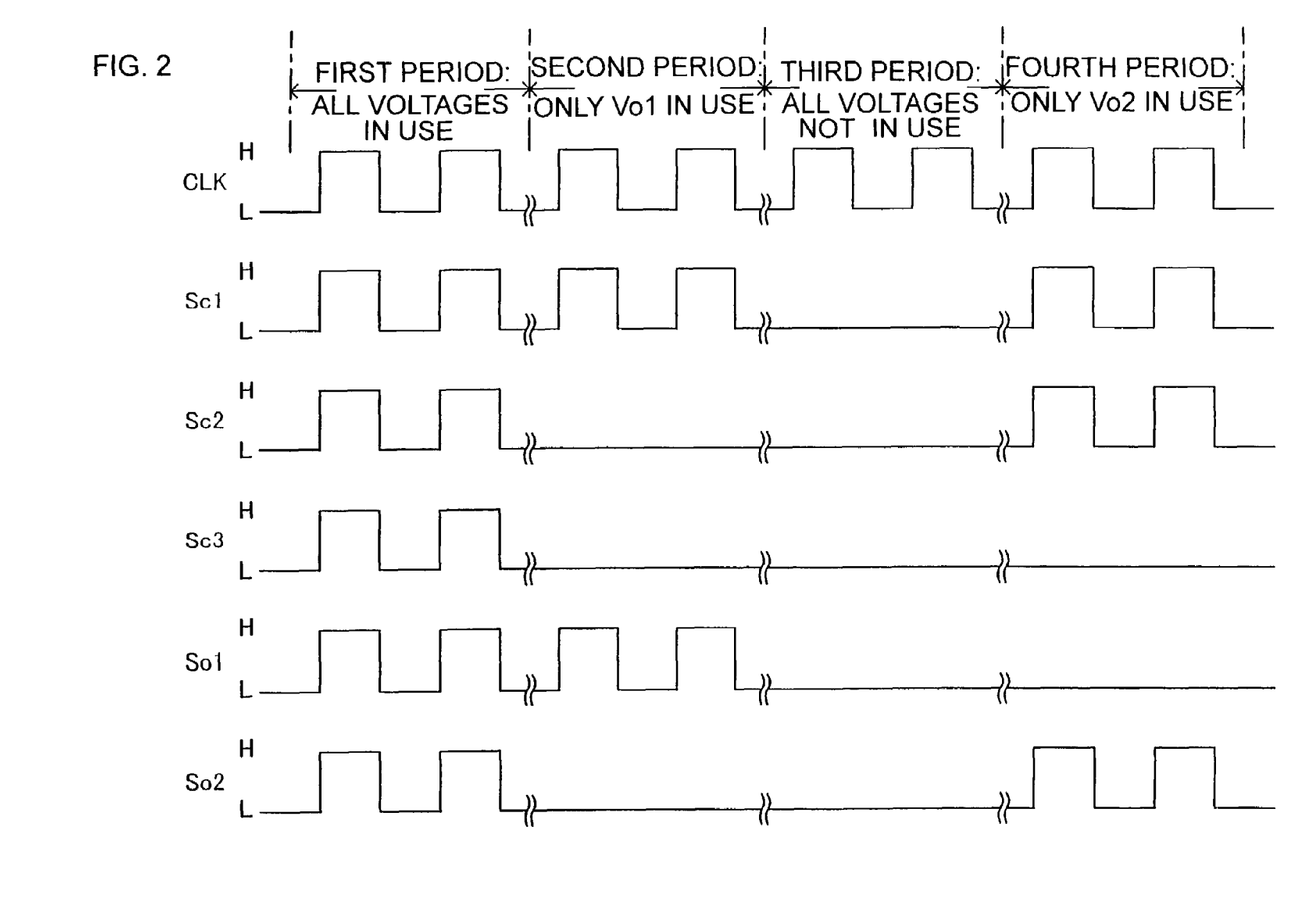
FIG. 2 is a timing diagram illustrating operation of the step-up power supply unit of FIG. 1.

Referring to the accompanying drawings, an inventive step-up power supply unit and a portable apparatus utilizing the same will now be described in detail by way of example. FIG. 1 shows a circuit configuration of a step-up power supply unit according to a first embodiment of the invention for use with a portable apparatus such as a mobile phone utilizing the step-up power supply unit. FIG. 2 is a timing diagram illustrating operation of the power supply unit of FIG. 1.

In FIG. 1, it is assumed that the power supply unit is intended for use with a mobile phone. The unit is fed an input voltage Vin of 3 V. A first output voltage Vo1 of the unit is 5 V, intended for use with R (red), G (green), and B (blue) light emitting diodes (LEDs). A second output voltage Vo2 is 7 V for use with a backlight source of a liquid crystal display panel (LCD). A third output voltage Vo3 is 10 V for use with a CCD camera. The input voltage Vin and the first output voltage Vo1 may also be supplied to a control IC, an LCD driven by the control IC, a speaker, and a motor of a vibrator.

Thus, the power supply unit of FIG. 1 is an example having three stages of charge pump units each constituting a step-up circuit. It should be understood that the number of the stages could be more or less than three, depending on the input voltage supplied thereto and the output voltages needed.

When the output voltages Vo1-Vo3 are required to be different from the voltages as described above, a different number of stages of charge pump units than three or a different input voltage Vin may be required. For example, when the third output voltage Vo3 of 15 V is required for a CCD camera, it is convenient to provide 5 stages of charge pump units, and the step-up voltage of the last stage will be used.

The first, second, and third stage charge pump units 10, 20, and 30, respectively, are connected in series as shown in FIG. 1. The third stage charge pump unit 30 is adapted to generate a step-up voltage of 4 Vin that is four times the input voltage Vin (3 V, for example); the second stage charge pump unit 20, generate a step-up voltage of 3 Vin that is three times the input voltage Vin; and the first stage charge pump unit 10, generate a step-up voltage of 2 Vin that is two times the input voltage Vin.

The first stage charge pump unit 10 includes a flying capacitor 11 and a first double-throw switch (hereinafter referred to as first changeover switch) 12 having a common terminal C connected to one end of the capacitor 11. The switch terminal A of the first changeover switch 12 is coupled to the input voltage Vin, while the switch terminal B is grounded. The common terminal C of a second changeover switch 13 is connected to the other end of the capacitor 11. The switch terminal A of the second changeover switch 13 is connected to the next charge pump unit 20, and the switch terminal B thereof is coupled to the input voltage Vin. The step-up voltage of the unit 10 is provided at the other end of the capacitor 11.

The second stage charge pump unit 20 includes a flying capacitor 21 and a first changeover switch 22 having a common terminal C connected to one end of the capacitor 21. The switch terminal A of the first changeover switch 22 is connected to the output end (that is, switch terminal A of the second changeover switch 13) of the first stage charge pump unit 10, while the switch terminal B thereof is grounded. The common terminal C of a second changeover switch 23 is connected to the other end of the capacitor 21. The switch terminal A of the second changeover switch 23 is connected to the charge pump unit 30 of the next stage, and the switch terminal B thereof is coupled to the input voltage Vin. The step-up voltage of the unit 20 is provided at the other end of the capacitor 21.

The third stage charge pump unit 30 has the same structure as the second stage charge pump unit 20, with its elements indicated by different (but similar) numerals. The third stage charge pump unit 30 is the last stage unit, providing its output voltage at the switch terminal A of the second changeover switch 33.

The first and the second changeover switches 12 and 13, respectively, are simultaneously switched by a switch control signal Sc1. The changeover switches 22 and 23 are simultaneously switched by a switch control signal Sc2, and so are changeover switches 32 and 33 by a switch control signal Sc3. These switching control signals Sc1-Sc3 are synchronized with a clock CLK clocking charge pump operation of the charge pump units, as shown in FIG. 2.

In the example shown in FIG. 1, the first and the second changeover switches 12 and 13, respectively, are thrown to the respective switch terminals A when the switch control signal Sc1 is high (H), and thrown to the respective switch terminals B when the switch control signal Sc1 is low (L).

The step-up voltage Vo1 of the charge pump unit 10 is output via a first output switch 14, which is synchronized to the clock CLK controlling the on-off operation of the first and the second changeover switches 12 and 13 and is controlled by the output voltage control signal Spc. Specifically, the output switch 14 is switched on and off by a first output control signal So1 going high (H) and low (L), respectively, in synchronism with the step-up voltage supplied to the switch 14. When the first output voltage Vo1 is not used, the switch 14 is held at the OFF state.

The second and the third charge pump units 20 and 30, respectively, perform similar step-up operations to that of the first charge pump unit 10. The operation of a second output switch 24 is similar to that of the output switch 14. Hence, their operations will not be described in detail here.

The step-up voltage of the first charge pump unit 10 is supplied, via the first output switch 14, to a smoothing capacitor 15 where the voltage is smoothed and then supplied to a series regulator (LDO) 16. The series regulator 16 regulates the voltage it receives to a predetermined voltage (of 5 V for example) and outputs the regulated voltage as the first output voltage Vo1.

The step-up voltage of the second charge pump unit 20 is supplied, via the second output switch 24, to a smoothing capacitor 25, where the voltage is smoothed and supplied to a series regulator 26 for regulation thereof to a predetermined voltage (7 V for example). The regulated voltage is output from the second stage charge pump unit 20 as the second output voltage Vo2. Like the first output switch 14, the second output switch 24 is also synchronized with the changeover switches 22 and 23, and is switched on and off by a second output control signal So2.

It is noted that instead of providing the respective step-up voltages of the first and the second charge pump units 10 and 20 at the other ends of the respective capacitors 11 and 21, the step-up voltages may be provided at the switch terminals A of the second and the third switches 13 and 23, respectively. In the example shown herein, however, all the switches used are transistorized that they inevitably result in some voltage drops. Therefore, from the point of reducing energy loss by the switches, it is preferable to provide the step-up voltages at the other ends of the capacitors 11 and 21 as shown in FIG. 1.

The step-up voltage of the last stage charge pump unit, which is the third charge pump unit 30 in the example shown herein, is provided directly (i.e. without any output switch) at the output terminal A of the second changeover switch 33. This step-up voltage is smoothed by the capacitor 35 before it is supplied to a series regulator 36 for regulation thereof to a predetermined voltage. The regulated voltage is output from the series regulator 36 as the third output voltage Vo3 (10 V for example).

The third (or last) stage charge pump unit 30 has no output switch, since provision of its output can be controlled by the second changeover switch 33. Accordingly, a control signal therefor is not needed, which simplifies the configuration of the unit 30.

Based on the output voltage control signal Spc instructing which of the first through third output voltages (Vo1-Vo3) to be output and on the clock CLK managing the timing of the respective switches (12-33), the switch control signals (Sc1, Sc2, Sc3) and the output control signals (So1, So2) are formed by a control circuit 40.

Table 1 lists output voltage control signals Spc formed by the control circuit 40, in relation to the output voltages Vo1-Vo3.

TABLE 1

| Output voltage | CLK | Sc1 | Sc2 | Sc3 | So1 | So2 | |
|---|---|---|---|---|---|---|---|
| Vo1-Vo3 | H/L | H/L | H/L | H/L | H/L | H/L | (FIG. 2 - First period) |
| Vo1&Vo2 | H/L | H/L | H/L | L | H/L | H/L | |
| Vo2&Vo3 | H/L | H/L | H/L | H/L | L | H/L | |
| Vo1&Vo3 | H/L | H/L | H/L | H/L | H/L | L | |
| Vo1 | H/L | H/L | L | L | H/L | L | (FIG. 2 - Second period) |
| Vo2 | H/L | H/L | H/L | L | L | H/L | (FIG. 2 - Fourth period) |
| Vo3 | H/L | H/L | H/L | H/L | L | L | |
| None | H/L | L | L | L | L | L | (FIG. 2 - Third period) |

Referring to Table 1 and FIG. 2, a few modes of operation of the power supply unit providing different output voltages will now be described.

First, consider a case where the first through third output voltages Vo1-Vo3 are to be output. In this case, all of the switch control signals Sc1-Sc3 and output control signals So1 and So2 are synchronized with the clock CLK. This causes the charge pump units 10-30 to perform charge pump operation and causes the series regulators 16-36 to output the first through third output voltage Vo1-Vo3.

Next, consider a case where the mobile phone is in use for e-mail communications without using a camera. In this case, only the first and the second output voltages Vo1 and Vo2 are output, since the third output voltage Vo3 is not needed then. In this case, the switch control signal Sc3 remains low (L) and other switch control signals undergo transitions between the H and L levels. Thus, the changeover switches 32 and 33 of the third stage charge pump unit 30 are thrown to the switch terminal B. Accordingly, the power consumption due to the switching of the third charge pump unit 30 is eliminated.

In a case of receiving a call, for example, where both the camera of the mobile phone and the backlight source of LCD are not used while using RGB LEDs, the second and the third output voltages (Vo2 and Vo3) are not output, but only the first output voltage Vo1 is output. In this case, the switch control signal Sc1 and the output control signal So1 make transitions between H and L level. Other switching signals (switch control signals Sc2 and Sc3) and output control signal So2 are held low (L). Therefore, only the first stage charge pump unit 10 performs charge pump operation. Provision of the first output voltage Vo1 is controlled by on-off operation of the first output switch 14 in synchronism with the unit 10. In this case, the charge pump units 20 and 30 and the series regulator 26 and 36 are disabled.

In a case where only the camera is used, only the third output voltage Vo3 is output. In this case, in order to obtain the step-up voltage of the third stage charge pump unit 30, the first through third stage charge pump units 10-30 are put in charge pump operation. However, since the output control signals So1 and So2 are held at low level (L) to render the first and the second output switches 14 and 24 turned off, wasteful power consumption by the series regulators 16 and 26 is avoided.

In other cases shown in Table 1, the charge pump units perform similar operations in accord with the logical conditions listed in the table.

In this way, instead of providing all the output voltages at all times, the power supply unit of the invention provides different output voltages in combination as needed by the portable apparatus. It is noted that an appropriate combination of different output voltages are generated from a single power source such as a battery according to the use condition of the portable apparatus.

It is also noted that only one step-up circuit is required to generate the multiplicity of output voltages Vo1-Vo3, which helps reduce in size, and hence the cost, of the LSI constituting the step-up circuit.

It will be appreciated that by selectively connecting and/or disconnecting switches of the step-up circuit for generating the multiplicity of output voltages Vo1-Vo3, the inventive power supply unit can partly disable the step-up circuit to generate some output voltages as needed. In other words, the invention can control the number of active charge pump units of the step-up circuit to reduce its power consumption.

It will be also appreciated that by supplying optimal step-up voltages to the respective series regulators 16-36, the output voltages Vo1-Vo3 can be obtained with the least power loss by the regulators 16-36, allowing the power supply unit to have maximum power conversion efficiency.

Figure 3:
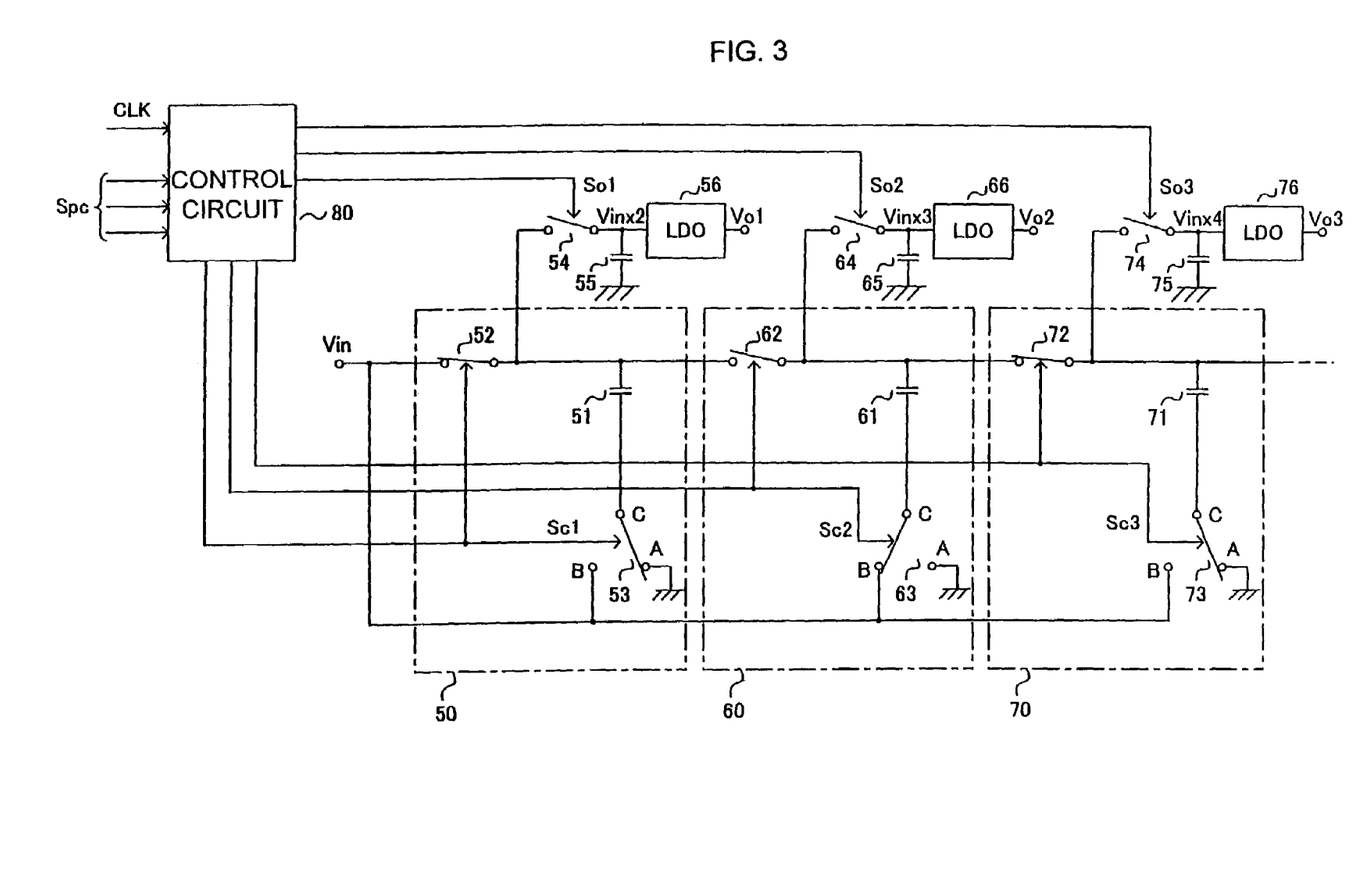
FIG. 3 is a circuit diagram of a step-up power supply unit in accordance with a second embodiment of the invention.
Figure 4:
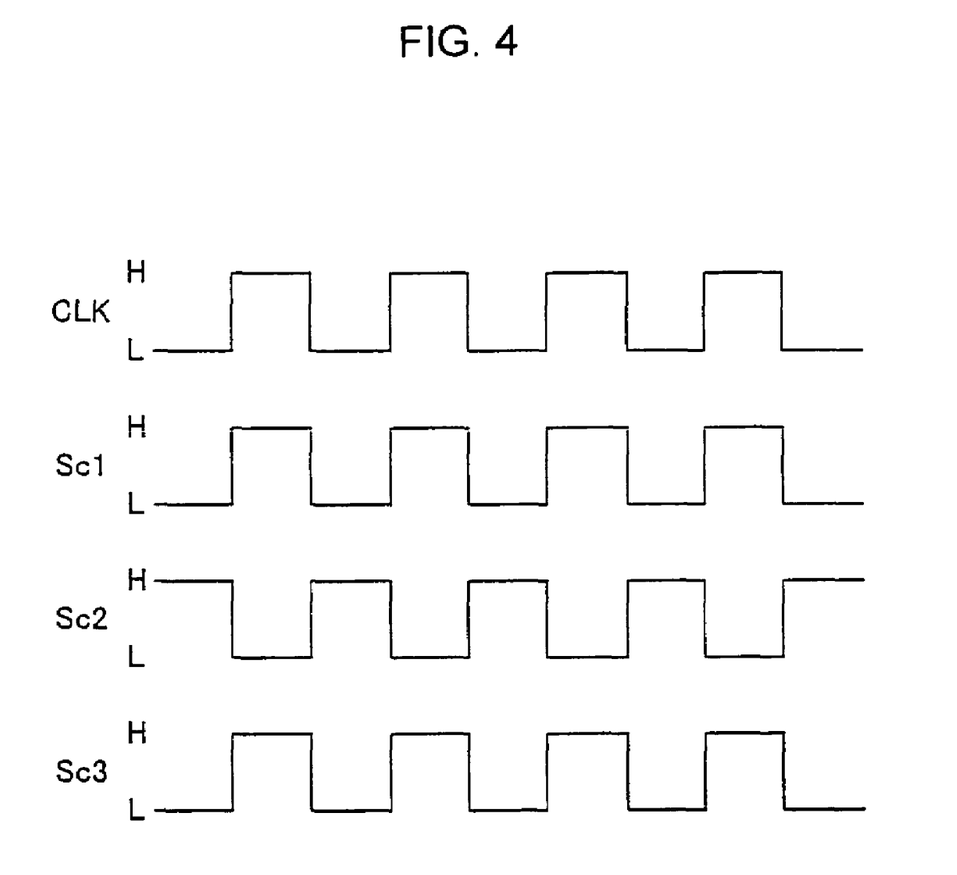
FIG. 4 is a timing diagram illustrating operation of the step-up power supply unit of FIG. 3.

Referring to FIG. 3, there is shown a circuit configuration of a second inventive step-up power supply unit for use with a portable apparatus such as a mobile phone utilizing the power supply unit. FIG. 4 is a timing diagram for the switching operations of the power supply unit of FIG. 3.

Charge pump units 50-70 of FIG. 3 differ in configuration from those of the charge pump units 10-30 of FIG. 1, and hence control signals issued from a control circuit 80 differ in part from those of FIG. 1. However, the basic operations of the units are the same, so that major difference between them will be described below.

A first stage charge pump unit 50 includes a capacitor 51 and a single -throw switch 52 having one end connected to one end of the capacitor 51. The first step-up voltage is provided at the node of the capacitor 51 and the switch 52. The node, serving as the output terminal of the first stage, is connected to a second stage charge pump unit 60. Connected to the other end of the capacitor 51 is a common terminal C of a changeover switch 53. The switch terminal A of the changeover switch 53 is grounded, and the switch terminal B of the switch 53 is coupled to the input voltage Vin.

The second and the third stage charge pump units 60 and 70, respectively, are the same in structure as the first stage charge pump unit 50, having like elements indicated by like numerals as shown.

The switch 52 and the changeover switch 53 are switched together by a switch control signal Sc1. So are a switch 62 and a changeover switch 63 by a switch control signal Sc2, and a switch 72 and the changeover switch 73 by a switch control signal Sc3.

The second example shown in FIG. 3 differs from that of FIG. 1 in that the switching operations of odd-numbered charge pump units 50 and 70 and those of even-numbered charge pump unit 60 are opposite in phase. For example, when the switch 52 of the first stage charge pump unit 50 turns on, the switch 62 of the second stage charge pump unit 60 turns off. FIG. 4 shows the timing diagram of the switch control signals. Sc1-Sc3 for realizing such opposite phase relationship, along with the clock CLK.

In the step-up circuit of FIG. 3, the switch 52 turns on and the changeover switch 53 is thrown to the switch terminal A when the switch control signal Sc1 is high (H). When the switch control signal Sc1 is low (L), the switch 52 turns off and the changeover switch 53 is thrown to the switch terminal B. A first output switch 54 is switched on when the output control signal So1 is high (H), and switched off when the signal is low (L).

Since the step-up voltage applied to the first output switch 54 is pulled up and down by the switch 52 and the changeover switch 53, the first output switch 54 is adapted to be switched on and off by the first output control signal So1 in synchronism with the switch 52 and the changeover switch 53, that is, the first output switch 54 is switched on when the applied step-up voltage goes high and switched off when the applied step-up voltage goes low. When the first output voltage Vo1 is not needed, the first output switch 54 is switched off.

The same is true for the second and the third stage charge pump units 60 and 70, respectively, and for the second and the third output switches 64 and 74, respectively.

The step-up voltage of the first stage charge pump unit 50 is supplied, via a first output switch 54, to a smoothing capacitor 55, where it is smoothed before it is supplied to a series regulator 56. The smoothed voltage is regulated by the series regulator 56 to a predetermined voltage, and is output therefrom as the first output voltage Vo1.

The second and the third step-up voltages are formed by the second and the third stage charge pump units 60 and 70, respectively, through similar switching operations. It should be noted, however, that the power supply unit of FIG. 3 differs from that of FIG. 1 in that the former unit is provided with a third output switch 74. However, the third output switch 74 can be omitted if the switch 72 is adapted to be turned off when the third stage charge pump unit 70 be disabled.

In FIG. 3, each of the switches 52, 62, and 72 may be replaced by a diode adapted to flow current in the forward direction to ensure required step-up operation. However, when the diodes are employed in this way, the third output switch 74 is necessary.

The switch control signals Sc1, Sc2, and Sc3 controlling the respective switches of the power supply unit and the output control signals So1, So2, and So3 shown in FIG. 3 are formed by the control circuit 80 based on the output voltage control signal Spc instructing which of the first-third output voltages be output and on the clock CLK controlling the timing of the respective switches.

Table 2 is a list of various kinds of signals formed by the control circuit 80, in relation to the output voltages Vo1-Vo3.

TABLE 2

| Output voltage | CLK | Sc1 | Sc2 | Sc3 | So1 | So2 | So3 |
|---|---|---|---|---|---|---|---|
| Vo1-Vo3 | H/L | H/L | L/H | H/L | L/H | H/L | L/H |
| Vo1 & Vo2 | H/L | H/L | L/H | L | L/H | H/L | L |

TABLE 2-continued

| Output voltage | CLK | Sc1 | Sc2 | Sc3 | So1 | So2 | So3 |
|---|---|---|---|---|---|---|---|
| Vo2 & Vo3 | H/L | H/L | L/H | H/L | L | H/L | L/H |
| Vo1 & Vo3 | H/L | H/L | L/H | H/L | L/H | L | L/H |
| Vo1 | H/L | H/L | L | L | L/H | L | L |
| Vo2 | H/L | H/L | L/H | L | L | H/L | L |
| Vo3 | H/L | H/L | L/H | H/L | L | L | L/H |
| None | H/L | L | L | L | L | L | L |

Referring to Table 2 and FIG. 4, a few modes of operation of the power supply unit providing different combinations of the output voltages will now be explained. In cases where the first through third output voltages Vo1-Vo3 are all to be output, all of the switch control signals Sc1-Sc3 and output control signals So1 and So2 are all synchronized with the clock CLK such that the output control signal So2 for the even-numbered stage (i.e. second stage) of charge pump unit 60 is opposite in phase with respect to the output control signals So1 and So3 for the odd numbered stages (i.e. first and third stages) of charge pump units 50 and 70. As a result, the first through third output voltages Vo1-Vo3 are output from the respective series regulators 56-76.

Next, when the camera of the mobile phone is not used, so that the third output voltage Vo3 is not needed, only the first and the second output voltages Vo1 and Vo2, respectively, are output. In this case, the switch control signal Sc3 and the output control signal So3 remain low (L level), but the rest of the signals undergo transitions between the high level (H) and the low level (L). To do this, the changeover switch 72 of the third stage charge pump unit 70 is switched off, and the changeover switch 73 is thrown to the switch terminal B and the third output switch 74 is switched off. As a consequence, the step-up operation of the third stage charge pump unit 70 is stopped, thereby outputting no third output voltage Vo3 while outputting the output voltages Vo1 and Vo2. Accordingly, the power consumption due to the switching of the third charge pump unit 70 will be cut off.

In a case where neither of the camera of the mobile phone or the backlight source of the LCD is used while using the RGB LEDs, only the first output voltage Vo1 is output. In this case, the switch control signal Sc1 and the output control signal So1 undergo transitions between the L and H levels in the opposite phases relative to each other. The rest of the switch control signals Sc2 and Sc3 and the output control signals So2 and So3 are held low (L). Therefore, only the first stage charge pump unit 50 performs charge pump operation, so that the first output switch 54 is switched on and off in synchronism with the switch control signal Scd to output the output voltage Vo1. In this case, the charge pump units 60 and 70 and their series regulator 66 and 76 are disabled.

The second embodiment shown in FIG. 3 implements the same function as the first embodiment shown in FIG. 1.

What we claim is:

1. A step-up voltage supply unit comprising:
a first charge pump unit having
a first capacitor,
a first double throw switch having a common terminal coupled to one end of said first capacitor, a first terminal coupled to an input terminal whereto input voltage is supplied, and a second terminal coupled to the ground, and
a second double-throw switch having a common terminal coupled to another end of said first capacitor, a first terminal, and a second terminal coupled to said input terminal, said second double throw switch operated by the same control signal as said first double throw switch, a first step-up voltage outputting switch for outputting a first step-up voltage from another end of said first capacitor, a second stage charge pump unit having a second capacitor, a third double-throw switch having a common terminal coupled to one end of said second capacitor, a first terminal coupled to the first terminal of said second double throw switch, and a second terminal coupled to the ground, and a fourth double-throw switch having a common terminal coupled to another end of said second capacitor, a first terminal, and a second terminal coupled to said input terminal, said fourth double throw switch operated by the same control signal as said third double throw switch, a second step-up voltage outputting switch for outputting a second step-up voltage from another end of said second capacitor, a last stage charge pump unit having a third capacitor, a fifth double-throw switch having a common terminal coupled to one end of said third capacitor, a first terminal coupled to the first terminal of said fourth double throw switch, and a second terminal coupled to the ground, and a sixth double-throw switch having a common terminal coupled to another end of said third capacitor, a first terminal, and a second terminal coupled to said input terminal, said sixth double throw switch operated by the same control signal as said fifth double throw switch, and a control circuit for outputting an output voltage control signal for synchronizing said first and second double throw switches and said first step-up voltage outputting switch, and switching on and off, when outputting a first step-up voltage of said first stage charge pump unit, synchronizing said first, second, third, and fourth double throw switches and said second step-up voltage outputting switch, and switching on and off, when outputting a second step-up voltage of said second stage charge pump unit, and switching on and off said first, second, third, fourth, fifth and sixth double throw switches and said second step-up voltage outputting switch, when outputting a third step-up voltage of said last stage charge pump unit, wherein said step-up voltage supply unit outputs a third step-up voltage from the first terminal of said sixth double throw switch of said last stage charge pump unit without passing through any output switch.

2. A step-up voltage supply unit comprising:

a first charge pump unit having a first capacitor, a first single throw switch having one terminal coupled to one end of said first capacitor and another end coupled to an input terminal whereto input voltage is supplied, a first double throw switch having a common terminal coupled to another end of said first capacitor, a first terminal coupled to said input terminal, and a second terminal coupled to the ground, said first double throw switch operated by the same control signal as said first single throw switch, a first step-up voltage outputting switch for outputting a first step-up voltage from one end of said first capacitor, a second stage charge pump unit having a second capacitor, a second single throw switch having one terminal coupled to one end of said second capacitor and another end coupled to one end of said first capacitor, a second double throw switch having a common terminal coupled to another end of said second capacitor, a first terminal coupled to said input terminal, and a second terminal coupled to the ground, said second double throw switch operated by the same control signal as said second single throw switch, a second step-up voltage outputting switch for outputting a second step-up voltage from one end of said second capacitor, a last stage charge pump unit having a third capacitor, a third single throw switch having one terminal coupled to one end of said third capacitor and another end coupled to one end of said second capacitor, a third double throw switch having a common terminal coupled to another end of said third capacitor, a first terminal coupled to said input terminal, and a second terminal coupled to the ground, said third double throw switch operated by the same control signal as said third single throw switch, a third step-up voltage outputting switch for outputting a third step-up voltage from one end of said third capacitor, a control circuit for outputting an output voltage control signal for synchronizing said first single and double throw switches and said first step-up voltage outputting switch, and switching on and off, when outputting a first step-up voltage of said first stage charge pump unit, synchronizing said first and second single throw switches and said first and second double throw switches and said second step-up voltage outputting switch, and switching on and off, when outputting a second step-up voltage of said second stage charge pump unit, and switching on and off said first, second, and third single throw switches and said first, second, and third double throw switches and said third step-up voltage outputting switch, when outputting a step-up voltage of said last stage charge pump unit, wherein said step-up voltage supply unit outputs first, second and third step-up voltage via said first, second and third step-up voltage outputting switches, respectively.

* * * * *